June 18, 1963 J. G. KAY ET AL 3,094,242
ESCAPEMENT ASSEMBLY FOR WORKPIECES
Filed April 4, 1960 2 Sheets-Sheet 1

INVENTORS
JOHN G. KAY
ALFRED L. OSINSKI
BY
ATTORNEY

June 18, 1963 J. G. KAY ET AL 3,094,242
ESCAPEMENT ASSEMBLY FOR WORKPIECES
Filed April 4, 1960 2 Sheets-Sheet 2
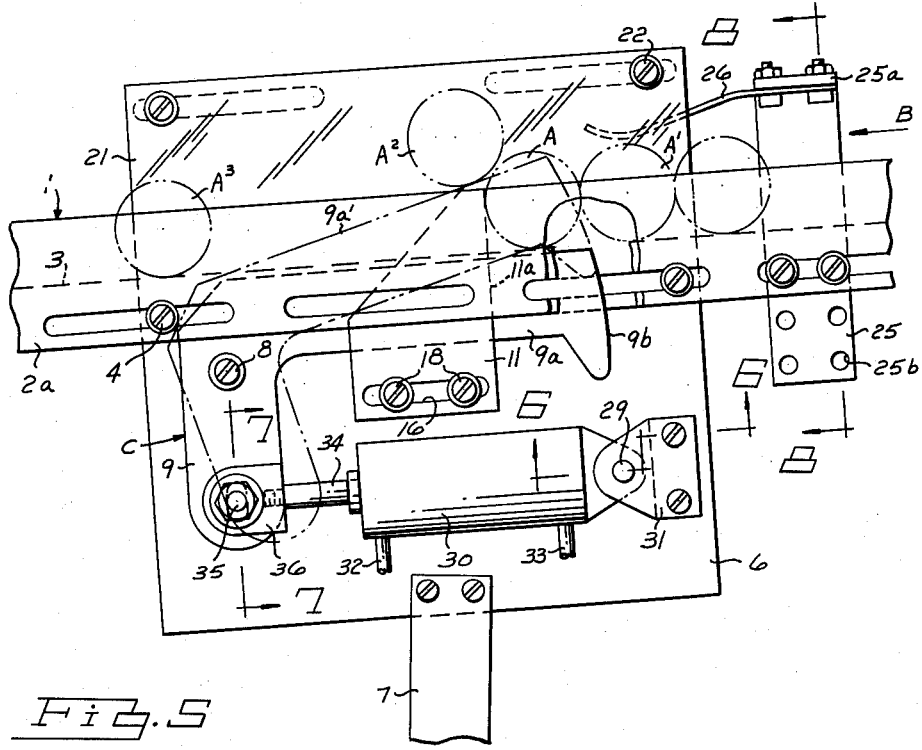
Fig. 5
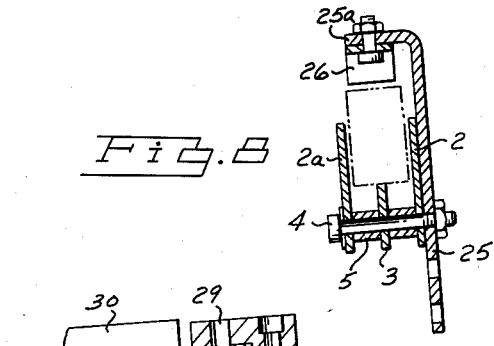
Fig. 8
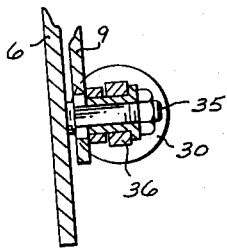
Fig. 7
Fig. 6
INVENTORS
JOHN G. KAY
ALFRED L. OSINSKI
BY
ATTORNEY

3,094,242
ESCAPEMENT ASSEMBLY FOR WORKPIECES
John G. Kay, Detroit, and Alfred L. Osinski, Warren, Mich., assignors to F. Jos. Lamb Company, Detroit, Mich., a corporation of Michigan
Filed Apr. 4, 1960, Ser. No. 19,788
6 Claims. (Cl. 221—241)

This invention relates to improvements in escapements for workpieces. It is frequently very desirable, particularly in automated installations, to provide an escapement for controlling a flow of workpieces to the input side of a machine by which they are to be processed. It is also a common practice to tool such a machine for the manufacture of workpieces of one size and then to change the tooling and process workpieces of another size on the same machine. To do this necessitates the use of an adjustable escapement which may be quickly and easily set for handling workpieces of any given size within a reasonable range.

It is therefore an object of the invention to provide an escapement for workpieces which may be readily installed on a conveyor intermediately of its length, and wherein the escapement is provided with ready means of adjustment so that it may be readily set to handle different sized workpieces.

Another object of the invention is to provide such an escapement wherein adjustment to suit the size of the workpieces may be readily made while the device is in position on a conveyor.

A further object of the invention is to provide such an escapement which is cheap and simple to manufacture.

Figure 1:
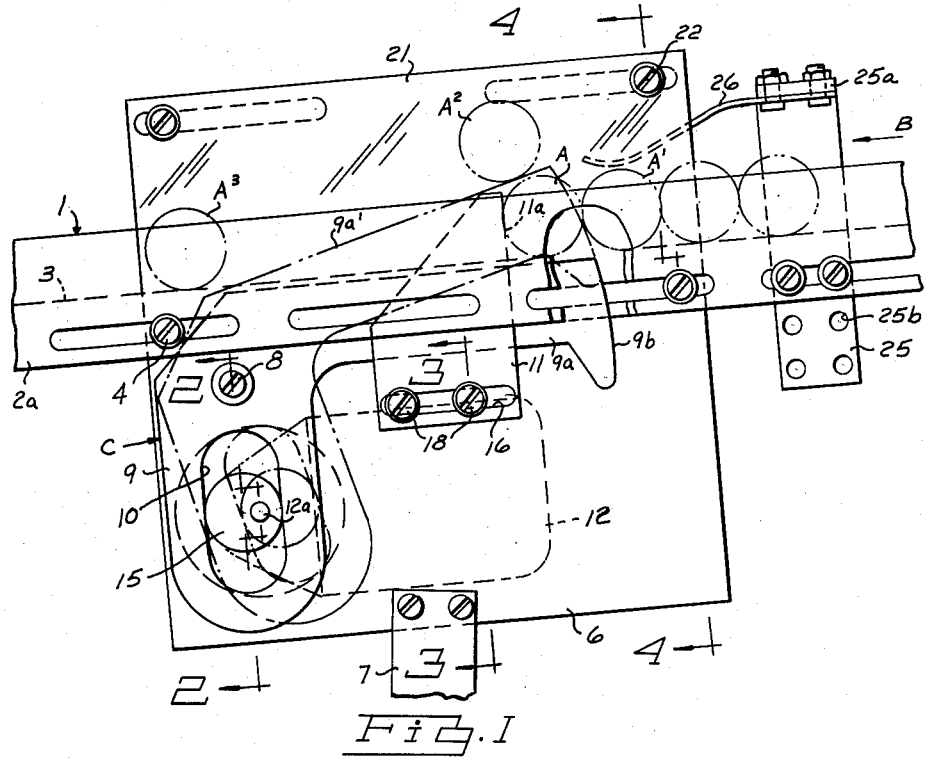

Having thus briefly and broadly stated some of the objects and advantages of the invention, we will now describe a preferred embodiment thereof with the aid of the accompanying drawings, in which:

FIGURE 1 is a side elevation of the invention, and

Figures 2, 4:
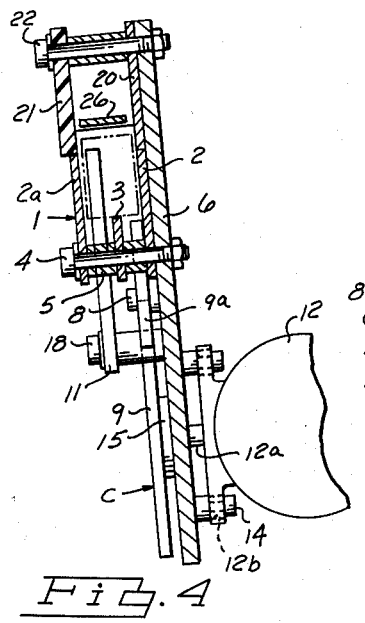
Figure 3:
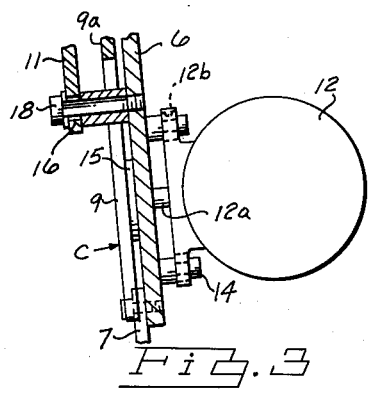

FIGURES 2, 3 and 4 are sections on the lines 2—2, 3—3 and 4—4, respectively, of FIGURE 1.

FIGURE 5 is a side elevation of the invention showing a modified drive arrangement for the bellcrank, and FIGURES 6, 7 and 8 are sections on the lines 6—6, 7—7, and 8—8, respectively of FIGURE 5.

Referring to the drawings, 1 designates a known type of conveyor shown in the form of a gravity chute. This chute consists of opposed parellel side walls 2 and 2a having a bearing strip 3 between them along which workpieces A are adapted to travel. 4 denotes longitudinally spaced bolts having spacers 5 thereon for retaining the side walls 2 and 2a, and the bearing strip 3 between them, uniformly spaced from one another.

Secured to the side wall 2 and extending both above and beneath it is a support or vertical plate 6 which may be further supported as by a post 7. Mounted on a horizontal pivot pin 8 projecting from the plate 6 is a bellcrank C which includes an actuating arm 9 and a lifter arm 9a. The arm 9 normally extends substantially vertically, and the lifter arm 9a substantially parallel with and beneath the bearing strip 3 to swing upwardly between the latter and the side wall 2. A stop 11, which projects upwardly between the bearing strip 3 and the side wall 2a is provided with a slot 16 which extends parallel with the conveyor and beneath the side walls and the bearing strip. Through the slot 16 screws 18 in threaded engagement with the plate 6 extend to permit adjustment of the stop 11 parallel with the conveyor.

The stop 11 halts movement of workpieces travelling in the direction of the arrow B in FIGURES 1 and 5, and when the bellcrank C is oscillated a workpiece resting against the stop is raised by the lifter arm 9a until it reaches a sufficient height to roll over the top of the stop. Then it rolls down the upper edge face of the lifter arm back onto the conveyor as indicated at $A^2$ and $A^3$ respectively. The spacing of the outer edge 11a of the stop 11 relative to the outer extremity of the lifter arm 9a is made adjustable because the said arm must project outwardly beyond the vertical axis of a workpiece A resting against the stop, but not far enough beyond the said axis to contact the workpiece A' next but one to the stop as the said arm moves upwardly about the pivot pin 8 to its raised position 9a'. For if the arm 9a during its upward movement did engage the workpiece A' it would displace that and other workpieces on the conveyor travelling towards the stop. Consequently the stop must be adjusted towards the pivot pin 8 if larger workpieces are to be transported along the conveyor and away from the pivot pin if smaller workpieces are to be transported. It will also be noted that the outer face 9b of the lifter arm 9a is coaxial with the pin 8, and the said arm is tall enough so that when raised to its maximum height the said outer face still projects beneath the bearing strip 3 so that a workpiece which rolls against it during its upward or return travel is held stationary thereby and prevented for the time being from rolling on to the stop 11.

Secured to the inner face of the plate 6 and projecting upwardly from the upper edge face of the side wall 2 on both sides of the stop 11 is a pad 20, and mounted opposite the latter on the upper margin of the side wall 2a is another pad 21. 22 denotes bolts holding the pads 20 and 21 to the plate 6 and in spaced relation to one another with their opposed inner faces in alignment with the inner faces of the side wall 2 and 2a respectively, to retain passing workpieces in alignment. Moreover the pad 21 is shown made of transparent plastic so that workpieces are clearly visible therethrough.

Mounted on the conveyor and preferably secured to the side wall 2 by some of the bolts 4 is a bracket 25 having its upper margin 25a bent inwardly over the conveyor. Secured to the underside of the bent margin 25a is a leaf spring 26 which is downwardly flexed to extend over the path of the workpieces and prevent any material upward movement of them as they approach the stop 11. Additional vertically spaced openings 25b may be formed through the bracket for passage of the bolts 4 so that the bracket may be vertically adjusted and the height of the spring spaced the desired distance above the workpieces irrespective of their diameter.

The construction of the escapement so far described is the same in all the views, but in FIGURES 1 to 4 movement of the bellcrank C is obtained through rotation of a conventional motor driven speed reducer unit 12 which is so arranged that the angular distance through which the bellcrank is oscillated is adjustable, whereas in the arrangement shown in FIGURES 5 to 8 oscillation of the bellcrank is obtained from an air cylinder 30 having a reciprocating piston and piston rod.

Referring first to the arrangement shown in FIGURES 1 to 4, a conventional motor driven speed reducer unit 12 having vertical slots 12b in its frame is secured for vertical adjustment upon the plate 6 by screws 14 which pass through the said slots, and fixedly mounted around the drive shaft 12a of the reducer unit is an eccentric 15. Formed through the actuating arm 9 which is substantially vertical is a longitudinal slot 10 in which the eccentric is located so that rotation of the speed reducer unit imparts oscillation to the bellcrank C. Consequently by adjustment of the vertical distance of the reducer unit beneath the pivot pin 8 the throw, or angular distance, through which the bellcrank is oscillated may be regulated. This angular distance is preferably greater for workpieces of smaller diameter than for larger ones, for in all cases a workpiece must be lifted so that its horizontal axis is sufficiently above the top of the stop to pass thereover and obviously then smaller workpieces need to be lifted higher. This adjustment is useful in cases where workpieces of a wide range of diameters, some of them quite small, are to be handled from time to time, however if the workpieces in different runs do not vary materially in diameter the setting of the height of the speed reducer unit on the plate 6 may be allowed to remain undisturbed.

In the arrangement shown in FIGURES 5 to 8, a conventional air cylinder 30 is pivotally supported at 29 on a bracket 31 mounted on the plate 6. 32 and 33 show the usual air connections to opposite ends of the cylinder. Mounted for reciprocation in the cylinder is a conventional piston (not shown) from which a piston rod 34 extends. Secured to and projecting from the actuating arm 9 is a pin 35 to which a cross head 36 on the outer extremity of the piston rod is connected, so that as the piston is reciprocated the bellcrank C is oscillated about the pivot pin 8. In this arrangement no provision is made for adjusting the length of throw of the bellcrank but is entirely satisfactory in cases where the diameter of the workpieces is constant, or if the variation in their diameters in different runs is not to be excessive.

While in the foregoing the preferred forms of the invention have been described and shown, it is understood that alterations may be made thereto provided the said alterations fall within the scope of the appended claims.

What we claim is:

1. In combination, a gravity chute having a pair of side walls and a bearing strip spaced between the side walls and having its upper edge spaced below the upper edges of the side walls for supporting work pieces gravitating down the chute, an escapement for said work pieces and a plate having means thereon for securing it in vertical position against the outer face of one of the side walls of the chute, said escapement including a lifter arm pivotally supported on said plate in spaced relation to the inner side of said plate such that the arm is adapted to pivot about a horizontal axis upwardly between the bearing strip and one of said side walls, the pivotal support for said arm being located on the plate below the side walls of the chute, a stop, means mounting said stop on the inner face of said plate in spaced parallel relation thereto so as to project up between the bearing strip and one side wall of the chute and thereby halt work pieces travelling down the chute, said arm at its free end extending past the stop whereby work pieces travelling down the chute are arrested when they abut the stop and in the arrested position overlie the free end of the lifter arm and motor means mounted on said plate for oscillating the arm from a position wherein its free end is below the upper edge of the bearing strip to a position wherein its free end is above the upper end of said stop.

2. The combination called for in claim 1 including means on said plate for adjusting the stop longitudinally of the plate toward and away from the pivotal support of said arm.

3. The combination called for in claim 2 wherein said means for adjusting the stop on the plate comprises the means mounting the stop on the plate.

4. The combination called for in claim 3 wherein said mounting means comprises a slot in said stop and securing means extending through the slot and said plate.

5. The combination called for in claim 3 wherein the mounting means for said stop are located below the side walls of the chute.

6. The combination called for in claim 3 wherein said arm comprises a bellcrank, the free end of said bellcrank comprising a curved surface coaxial with the pivotal axis of the bellcrank.

References Cited in the file of this patent

UNITED STATES PATENTS

| 619,824 | Fetzer | Feb. 21, 1899 |
| 2,554,699 | Gamble | May 29, 1951 |
| 2,669,139 | Finch | Feb. 16, 1954 |
| 2,698,699 | Skillman | Jan. 4, 1955 |
| 2,751,781 | McConnell | June 26, 1956 |
| 2,820,573 | McConnell | Jan. 21, 1958 |
| 2,915,810 | Taylor et al. | Dec. 8, 1959 |
| 2,925,166 | Sawdey | Feb. 16, 1960 |

FOREIGN PATENTS

| 494,197 | Belgium | June 16, 1950 |